(12) United States Patent
Wurster et al.

(10) Patent No.: US 8,767,938 B2
(45) Date of Patent: *Jul. 1, 2014

(54) TELEPHONE NETWORK CONTROL SYSTEM AND METHOD

(75) Inventors: John Herman Wurster, Basking Ridge, NJ (US); Barbara Ann Hamilton, Sparta, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,061

(22) Filed: Nov. 9, 2009

(65) Prior Publication Data

US 2010/0054442 A1 Mar. 4, 2010

Related U.S. Application Data (60) Division of application No. 10/632,803, filed on Aug. 4, 2003, now Pat. No. 7,616,747, which is a continuation of application No. 09/751,392, filed on Jan. 2, 2001, now Pat. No. 6,647,108.

(51) Int. Cl.
H04M 3/42 (2006.01)
(52) U.S. Cl.
USPC .................................. 379/207.02; 379/211.01
(58) Field of Classification Search
USPC .................................. 379/207.02, 211.01, 215
See application file for complete search history.

(56) References Cited

U.S. PATENT DOCUMENTS

| | | | |
|---|---|---|---|
| 4,941,203 A | 7/1990 | Patsiokas et al. | |
| 5,247,571 A | 9/1993 | Kay et al. | |
| 5,526,413 A | 6/1996 | Cheston et al. | |
| 5,572,583 A | 11/1996 | Wheeler et al. | |
| 5,657,376 A * | 8/1997 | Espeut et al. | 379/88.17 |
| 5,805,587 A | 9/1998 | Norris et al. | |
| 5,809,128 A | 9/1998 | McMullin | |
| 5,825,862 A | 10/1998 | Voit et al. | |
| 5,930,700 A | 7/1999 | Pepper et al. | |
| 5,940,598 A | 8/1999 | Strauss et al. | |
| 5,946,381 A | 8/1999 | Danne et al. | |
| 5,982,774 A | 11/1999 | Foladare et al. | |
| 6,014,379 A | 1/2000 | White et al. | |
| 6,021,126 A | 2/2000 | White et al. | |
| 6,078,581 A | 6/2000 | Shtivelman et al. | |
| 6,122,516 A * | 9/2000 | Thompson et al. | 455/450 |
| 6,144,644 A * | 11/2000 | Bajzath et al. | 370/259 |
| 6,208,726 B1 | 3/2001 | Bansal et al. | |
| 6,219,413 B1 | 4/2001 | Burg | |
| 6,229,887 B1 * | 5/2001 | Albers et al. | 379/219 |
| 6,236,722 B1 * | 5/2001 | Gilbert et al. | 379/230 |
| 6,310,946 B1 | 10/2001 | Bauer et al. | |
| 6,366,661 B1 | 4/2002 | Devillier et al. | |
| 6,711,247 B1 | 3/2004 | Needham et al. | |
| 2001/0053213 A1* | 12/2001 | Truong et al. | 379/202.01 |
| 2002/0150227 A1* | 10/2002 | Abraham | 379/218.02 |
| 2005/0141490 A1* | 6/2005 | Dolan | 370/352 |

* cited by examiner

Primary Examiner — Rasha Al Aubaidi (57) ABSTRACT

A method of providing a user the option to accept an incoming call, play a prerecorded message to the incoming party, ignore the incoming call or forward the incoming call to a separate telephone number is disclosed for use when the user is connected, via the same telephone line, to the Internet. The disclosed invention reduces the number of times the incoming call is transferred which reduces the number of reserves used in processing the incoming call. This reduction frees up system resources and allows overall system resources to be used more efficiently.

21 Claims, 9 Drawing Sheets

TELEPHONE NETWORK CONTROL SYSTEM AND METHOD

RELATED APPLICATIONS

This application is a divisional of U.S. patent application Ser. No. 10/632,803, filed on Aug. 4, 2003, which is a continuation of U.S. patent application Ser. No. 09/751,392, filed Jan. 2, 2001, the contents of which are hereby incorporated by reference in its entirety.

TECHNICAL FIELD

The invention relates to a call processing feature for telephone calls and more particularly relates to a call processing feature for incoming calls placed to a shared usage voice and Internet access telephone line.

BACKGROUND

Telephone Network Control

All telecommunication systems having multiple switching offices which require signaling between the offices. Telephone networks require signaling between switching offices for transmitting, routing and obtaining destination information, for transmitting alerting messages such as to indicate the arrival of an incoming call, and for transmitting supervisory information, e.g., relating to line status. Signaling between offices can use 'in-band' or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until the office informs the originating office of the busy line condition. As shown by this example, in-band signaling greatly increases congestion on the traffic channels, that is to say, the voice channels in the voice telephone network example. In-band signaling also is highly susceptible to fraud because hackers have developed devices which mimic in-band signals.

Out-of-band signaling evolved to mitigate the problems of in-band signaling. Out-of-band signaling utilizes separate channels, and in many cases separate switching elements. As such, out-of-band signaling reduces congestion on the channels carrying the actual communications traffic. Also, messages from the end user always utilize an in-band format and remain in-band, making it virtually impossible for an end-user to simulate signal messages which ride on an out-of-band channel or network. Out-of-band signaling utilizes its own signal formats and protocols and is not constrained by protocols and formats utilized for the actual communication, therefore out-of-band signaling typically is considerably faster then in-band signaling.

Out of band signaling networks typically include data links and one or more packet switching systems. Out-of-band signaling for telephone networks is often referred to as Common Channel Signaling (CCS) or Common Channel Interoffice Signaling (CCIS). In the U.S., most such signaling communication for telephone networks utilize Signaling System 7 (SS7) protocol. An SS7 compliant CCIS network comprises data switching systems designated Signal Transfer Point (STP) and data links between the STP and various telephone switching offices of the network, i.e., the Service Switching Points (SSPs). In intelligent versions of the telephone network including high level central database and control nodes, identified as Service Control Points (SCPs) such as an Integrated Services Control Points (ISCPs) by Telcordia Technologies, the CCIS network also includes data links connecting the high level control nodes to one or more of the STP.

The STP are program controlled packet data switching systems. In operation, an STP receives a packet data message from another node of the network, for example from an end office SSP. The STP analyzes point code information in the packet and routes the packet according to a static translation table stored with the STP. Any packet having a particular point code is output on a port going to the next CCIS signaling node specified by translation of that point code.

The development of the CCIS network has recently permitted the offering of a number of new service features provided by centralized program control from a high level control point. Such an enhanced telephone network is often termed an Advanced Intelligent Network (AIN). In an MN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via the CCIS signaling network to an ISCP which may include a Multi-Services Application Platform (MSAP) database. If needed, the ISCP can instruct the central office to obtain and forward additional information. Once sufficient information about the call has reached the SCP, the SCP accesses it's stored data tables in the MSAP database to translate the received message data into a call control message and returns the call control message to the office of the network via CCIS link. The network offices then use the call control message to complete the particular call. An AIN type network for providing an Area Wide Centrex Service was disclosed and described in detail and commonly assigned U.S. Pat. No. 5,247,571 to Key et al., the disclosure of which is incorporated herein in its entirety by reference. Existing AIN type systems, such as disclosed in the Key et. al. patent, utilize the routing functionality of the STP and the CCIS network as described above. Every time a specified switching office launches a query for an identified SCP, the translation table in the STP(s) of the CCIS network causes the STP(s) to route the query message to that ISCP.

Many of the enhanced communications services offered by the MN permit a subscriber to input control information, to manage services as desired. For example, in a simple forwarding or redirection service, the subscriber might change the 'forward to' number from time to time to route calls to different destination. As another example, a subscriber might want to block calls unless they are to, or from, numbers on a list, and the subscriber would want to change the list of numbers from time to time. Some subscribers need to change certain information quite frequently, even for relative simple AIN services. Another example of an AIN feature is call waiting. Call Waiting, although it could be, is not an AIN service in Verizon. Call waiting is a telephone feature which alerts a called party to an incoming call when that party's telephone is busy with another call. An incoming call can be indicated to the called party by a click on the telephone line.

At that point, the called party may place the existing call on hold and answer the new incoming call.

The Internet and Telephone Access

Many users today connect their computer terminals to the Internet over a conventional POTS telephone line through a Local Exchange Carrier (LEC) to an Internet Access Provider (IAP), which provides access to the Internet and Internet Service Providers (ISPs). Most users today have a single telephone line to their homes and must disable call waiting when they are connected to the Internet. When call waiting is disconnected, callers receive a busy signal as long as the called party is connected to the Internet. With the call waiting disabled, the called party is unaware of the incoming call and does not have the opportunity to either end their Internet session or place their Internet session on hold to answer the incoming call.

U.S. Pat. No. 5,982,774 details a system, which when a user is connected to the Internet over their telephone line through an Internet Access Provider (IAP), allows the user to place their Internet connection on hold and connect to the incoming call. The Local Exchange Carrier (LEC) sends a signal to the IAP that indicates the presence of the waiting call. The IAP then transmits this information to the user's terminal, and the user may take the call.

U.S. Pat. No. 5,805,587 discusses a method in which a facility is provided to alert a subscriber connected to the Internet of a waiting call via their Internet connection. The waiting call may be forwarded via the Public Switched Network (PSN) to a services' platform which establishes a connection to the subscriber via the Internet. The subscriber is then notified of the waiting call and allowed access to, if desired, the incoming call.

However, these systems are relatively inflexible and involve rerouting calls to an intelligent platform to provide the logic and call processing functionality of the services.

A need exists which will notify the called party who is engaged in an Internet session, of the incoming call and allow them to end their Internet session and receive the incoming call, without the overhead associated with other methods.

SUMMARY OF THE INVENTION

The invention includes a method of and system for notifying an internet client that a call is being attempted to the subscriber's telephone line being used to access a data service, such as the Internet. The invention uses CCS and AIN features to determine that the subscriber's telephone line is being used to access an associated data service that is compatible with the present notification system. If the subscriber is using a compatible service, a data message is sent to the subscriber via that service to notify the subscriber of the incoming call. During this period, rather than rerouting the call, the destination SSP suspends processing until the subscriber selects from among several hardline procedures for the call. For example, the subscriber, using the computer terminal used to access the Internet (the "client" terminal) may elect to (i) ignore the incoming call; (ii) inform the incoming caller to call back later; (iii) route the call to another telephone number; (iv) route the call to a voice messaging platform; (v) allow the caller to input some form of identification, such as a PIN, to initiate special handling; (vi) accept the call and place the Internet connection on hold or terminate the Internet connection; (vii) route to call to a VoIP server and accept the call using the Internet; (viii) route the call to an intelligent peripheral (IP) allowing the subscriber to generate a customized voice message to be played or synthesized; or other options.

DETAILED DESCRIPTION

The present invention uses the facilities of the Advance Intelligent Network (AIN) and an Internet Application Server to detect that a line busy condition is related to a subscriber's connection to the Internet. Upon identification of the cause of the line busy condition, normal line busy processing is suspended to avoid interrupting and compromising the data connection. Instead, appropriate messaging is generated to notify the subscriber, via the existing Internet connection, that a call is being attempted together with information about the call (e.g., calling party name and number, etc.). The subscriber can then provide appropriate instructions for handling the call, such as having the switch play a message, routing the call to a voice messaging platform, suspending or terminating the data connection and completing the incoming call, etc. Thus, unnecessary rerouting of the incoming call is avoided, call completion signaling integrity is simplified and maintained, and voice network trunk requirements are minimized.

As described, the invention provides for multiple use of a telephone line to accommodate, for example, voice telephone service support of both conventional, relatively short duration voice calls and lengthier data communication connectivity such as for accessing the Internet. While the former use typically uses a conventional telephone, the later requires a data terminal such as a personal computer (PC). Typically, a PC runs application software referred to as a 'browser' to obtain and interact with various web pages of information from a network such as the Internet. Several vendors also offer a dedicated terminal device for providing Internet access using a conventional television set. While viewing pages using either type of terminal, the user can enter requests by clicking on links in the form of hyper-text or icons or can send typed inputs to a server. In this mode of operation, the terminal is acting as a "client" of the server supplying the requested information.

Figure 1:
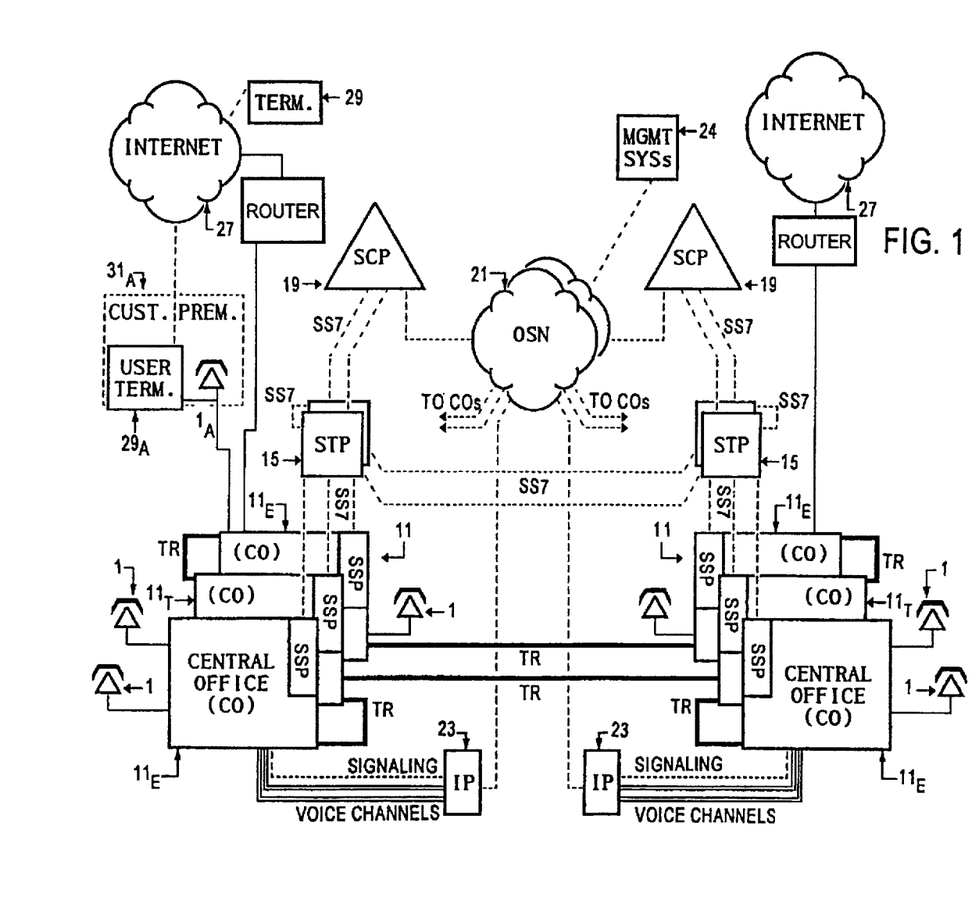
FIG. 1 is a block diagram of a switched telephone system providing internet and POTS services.

FIG. 1 is a high level block diagram of an intelligent telephone network, its control and management systems as well as the customer's access thereto. The communication network includes a switched telephone network as well as a private operations data network and management systems coupled thereto. The communication network connects to a public packet switched data network, such as the Internet via centralized modem banks and routers.

In the example depicted in FIG. 1, the telephone network includes Advanced Intelligent Network (AIN) capabilities to process and route calls. As shown, the telephone network includes a switched traffic network and a common channel signaling network carrying the control signaling messages for the switched telephone traffic network. The telephone or traffic network, operated by one carrier or a combination of local carriers and inter-exchange carriers, includes a number of nodes, typically end office and tandem office type central office (CO) switching systems 11 interconnected by trunk circuits TR. A number of subscriber stations, depicted as telephones 1, are connected to a series of central office switches 11. The connections to the central office switches 11 utilize telephone lines (e.g. POTS or ISDN), and the switches are telephone type switches for providing landline communication. However, it should be recognized that other communication links and other types of switches could be used. For example, some or all of the connections between the stations 1 and the central offices may include digital or analog radio links, and the central offices may include mobile telephone switching offices. Trunk circuits TR carry communication traffic between the central office switches 11.

Each end office type central office switch 11E provides switched telephone connections to and from local communication lines or other subscriber links coupled to end users stations or telephone sets 1. The typical telephone network also includes one or more tandem switching offices such as offices 11T, providing trunk connections between end offices and/or between other tandem offices. Other trunks TR might directly connect end offices 11E. Some offices may serve as both end offices and tandem offices for providing different call connections. As such, the traffic network consists of local communication links and a series of switching office type nodes interconnected by voice grade trunks TR.

Although shown as telephones in FIG. 1, the terminal devices or stations 1 can comprise any communication device compatible with the local communication link. Where the link is a standard voice grade telephone line, for example, the terminals could include facsimile devices, modems etc. Many subscribers will have terminals with access to a public packet switched data network, such as the Internet, and many of those terminals will utilize modem connections through the lines and switches 11 of the telephone traffic network to access the public data network.

The lines originating at and trunks originating/terminating and passing through the central offices 11 carry the communication traffic of the telephone network, including voice traffic and other "in-band" payload such as Internet access traffic. A common channel interoffice signaling (CCIS) network carries a variety of signaling messages relating to control of processing of various calls through the traffic portion of the network. The CCIS network includes packet data links (shown as dotted lines) connected to appropriately equipped central office switching systems such as Service Switching Points (SSP) 11 switches via a plurality Signaling Transfer Points (STP) 15 packet switches. To provide redundancy and thus a high degree of reliability, STPs 15 typically are implemented as mated pairs of STPs. The STP of each pair are interconnected with each other and with other pairs of STP on the CCIS network. The CCIS network of the telephone system operates in accord with an accepted signaling protocol standard, preferably Signaling System 7 (SS7).

As shown in FIG. 1, each central office 11 has SS7 signaling capability, and is conventionally referred to as a signaling point (SP) within the SS7 network. As such, the offices can exchange messages relating to call set-up and tear-down, typically in ISDN users part format (ISDN-UP) of the SS7 protocol.

At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node, such as one of the Service Control Points (SCPs) 19. An SCP 19 provides instructions relating to AIN type services in response to such queries. The signaling message communications between the central office switching systems utilize messages conforming to the Transaction Capabilities Application Part (TCAP) of the SS7 protocol. Those central office switching systems having full AIN trigger and TCAP query and response processing capabilities, for communication with the SCP, are referred to as Service Switching Points (SSPs).

A typical telephone network serving a large number of customers over a wide geographic area utilizes a number of SCPs 19, two of which appear in FIG. 1. Each SCP 19 connects through SS7 links to one pair of the STP 15. For most AIN services, a central office 11 obtains the requisite call control information from one SCP 19 serving the area in which the switch resides, However, some services do require signaling communication to more than one of the SCPs 19 to complete processing of a given call, and a variety of techniques for mediating these communications to local and remote SCPs are known.

The central office switches 11 typically consist of programmable digital switches with CCIS communications capabilities. One example of such a switch is a 5ESS type switch manufactured by Lucent Technologies; but other vendors, such as Northern Telecom and Siemens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The above described data signaling network between the SSP type central offices 11 and an SCP 19 is preferred, but other signaling networks could be used. For example, instead of the packet switched type links through one or more STP's, a number of central office switches 11, one of the SCPs 19 as well as other signaling nodes in a region could be linked for data communication by a token ring network. Also, the SSP capability may not always be available at the local office level, and several other implementations might be used to provide the requisite SSP capability. For example, none of the end office switches 11E may have SSP functionality. Instead, each end office would connect through a trunk to a tandem office 11T which has the SSP capability. The SSP tandem 11T then communicates with the SCP via an SS7 type CCIS link, as in the implementation described above. The SSP capable tandem switches are digital switches, such as the 5ESS switch from Lucent Technologies; and the non-SSP type end offices might be 1A analog type switches.

The telephone network can also includes one or more intelligent peripherals (IPs) 23 to provide enhanced announcement and digit collection capabilities and preferably speech recognition. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP from that Patent is incorporated herein in its entirety by reference.

Each IP 23 may connect to one or more of the central offices 11. The connections transport both communication traffic and signaling. The connection between a central office 11 and the IP 23 may use a combination of a T1 and a Simplified Message Desk Interface (SMDI) link, but preferably this connection utilizes a primary rate interface (PRI) type ISDN link. Each such connection between a CO 11 and an IP 23 provides digital transport for a number of two-way voice grade type telephone communications and a channel transporting signaling data messages in both directions between the switch 11 and the IP 23.

There are certain circumstances in which the SCP 19 communicates with the IP 23. These communications could utilize an 1129 protocol and go through an SSP type central office 11 and the SS7 network. However, in the embodiment of FIG. 1, the IP 23 and the SCP 19 communicate with each other via a separate second signaling network, for example via the network referred to as the Operations Systems Network (OSN) 21 in the drawing. These communications through network 21 between the IP and the SCP may utilize an 1129+ protocol or a generic data interface (GDI) protocol as discussed in the above incorporated Patent to Wheeler, Jr. et al.

On a normal call, an end office type switch 11E detects an off-hook condition on the line and provides dial tone. The switch identifies the line by its Office Equipment (OE) number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as an SCP 19. The SSP capable switching offices initiate such processing upon detection of triggering events. At some point during processing of a telephone call, a central office switching system 11 will recognize an event in call processing as a 'Point in Call' (PIC) which triggers a query, for example to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. For example, according to an embodiment of the present invention, the SSP serving the called party may implement a trigger on busy or terminating attempt trigger.

In operation, any given subscriber's telephone services therefore may be controlled by data residing in one or more of the central office switching systems 11, in one or more of the SCPs 19 or in one or more of the IPs 23. In a network such as shown in FIG. 1, routing typically is based on dialed digit information, profile information regarding the link or station used by the calling party and profile information regarding a line or station in some way associated with the dialed digits. The respective end office switches 11E store the profiles associated with the stations or lines served out of those offices. In the intelligent network implementation, each SCP 19 maintains a Multi-Services Application Platform (MSAP) database, which contains call processing records (CPRs) for processing of calls to and from various subscribers to AIN type services. For some services requiring processing by an IP 23, the IP also may store subscriber specific control information, for use in providing the subscriber with the desired service.

The telephone network operating company or carrier(s) utilize various network management systems 24. The 'management' of services includes control functions as well as monitoring and usage accounting functions. The management systems 24 include provisioning systems to establish, update and maintain the profiles and other control data in the central offices 11, the SCPs 19 and the IPs 23. The management systems 24 also include usage data processing systems for accumulating usage statistics and for processing usage data to create billing records.

In addition to SCPs, Intelligent SCPs (ISCPs) can be used for added functionality. Call processing records (CPRs) in the Multi-Services Application Platform (MSAP) database within each SCP are created and management by a terminal system referred to as a service creation environment (SCE) and a service management system (SMS). Profile data may be loaded into memory in the switches by an automated system, such as Memory Administration Recent Change System or 'MARCH'. MARCH qualifies the data, and if the data meets the relevant qualification criteria, MARCH transmits the data to the appropriate central office switch 11 for entry into memory. The management systems 24 may also include a variety of data accumulation systems, such as a data distributor coupled to an SCP and a computer system serving in a revenue accounting office, for preparing usage statistics and/or calculating bills.

Figure 2:
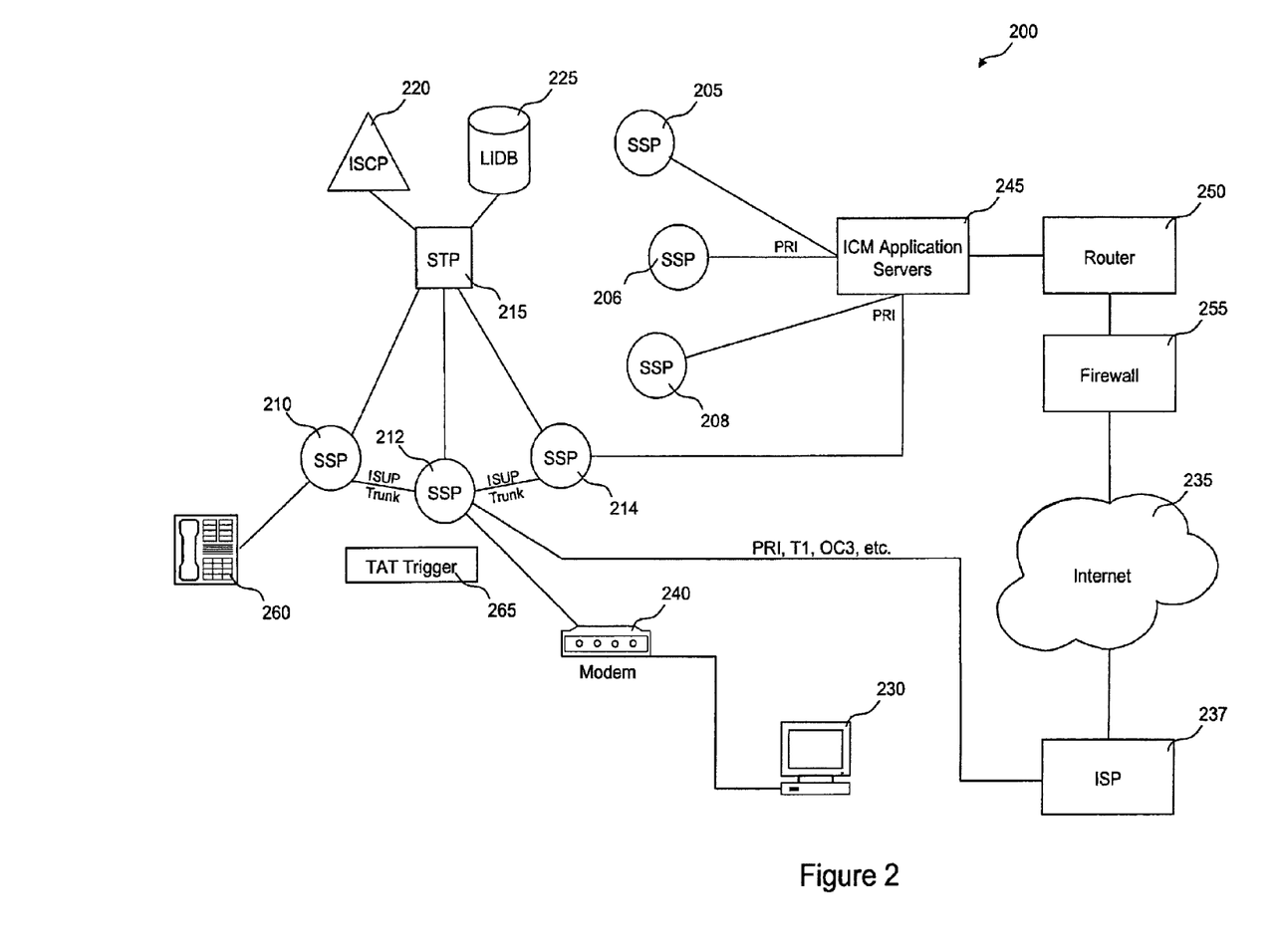
FIG. 2 is a block diagram of a switched telephone system including an internet call manager platform.

System 200 of FIG. 2 shows four central offices where each central office is similar to the central office's 11 shown in FIG. 1. Four of these central offices includes SSPs 205, 206, 207, and 208 functioning as Primary (PRI) hubs; central office SSPs 210 and 212 are not primary hubs. The Service Switching Points (SSP) also connect to a Signaling Transfer Point (STP) 215. In FIG. 2, the STP also connects to the Service Control Point (SCP) 220 and Local Information Database (LIDB) 225. When a user wishes to connect their computer 230 to the Internet 235 (whether or not they have subscribed to the Internet Call Manager (ICM) service according to the invention), the call is routed through modem 240 to SSP 212 and then via an appropriate network connection (e.g., PRI, OC3, T1, etc.) to the subscriber's selected ISP 237.

As described, when a user accesses the Internet 235 using their computer 230 with the ICM service according, the connection to the Internet includes ICM application server 245. When a user subscribes to the ICM service an appropriate trigger such as a Terminating Attempt Trigger (TAT) (see, for example, U.S. Pat. No. 5,825,862, incorporated herein in its entirety) or T-busy trigger is provisioned on their line. A call processing record is also established at the ISCP 220 on the subscriber's telephone number. This can be accomplished through the use of the Advanced Provisioning System (APS) which resides on the MSP. Additionally, the subscriber would access the appropriate software through a web site and download that information to their computer 230. At this point a customer profile for the subscriber is established on the ICM application server 245.

Once a subscriber's computer 230 has the required browser and ICM support software and the user has subscribed to ICM, ICM services are enabled during Internet access times. One embodiment of the ICM, includes software within the ICM application server 245 which recognizes when a subscriber computer 230 accesses the Internet 235. Once the ICM application server 245 recognizes that an Internet session has been established, the ICM application server 245 initiates a call to the subscriber's telephone number so that a flag is set in the ISCP indicating that the user has accessed the Internet. While the subscriber is accessing the Internet through the use of his computer 230, if a caller 260 initiates a call to the subscriber, the subscriber's TAT trigger 265 is encountered. The combination of the incoming calls encountered with the TAT trigger 265 and the flag which was set from the telephone call initiated by the ICM application server 245 determines whether the incoming call should be transferred or whether it should remain at the receiving SSP. Thus, if the subscriber's line is busy with another conventional voice call, the incoming call is processed normally at the subscriber's SSP. This processing may include transmission of a busy signal, provision of ring-back associated with call waiting services, call forwarding to a voice messaging platform, etc. Alternatively, if ICM application server 245 detects that the subscriber's line is being used to connect with the Internet, a TAT or similar trigger initiates alternative processing. According to one aspect of the invention, as will be described, call processing is temporarily suspended at the receiving switch until routing instructions from the subscriber are solicited, received, and processed. Alternatively, the TAT may prompt rerouting of the call to an intelligent peripheral (IP) for ICM processing.

Figure 3:
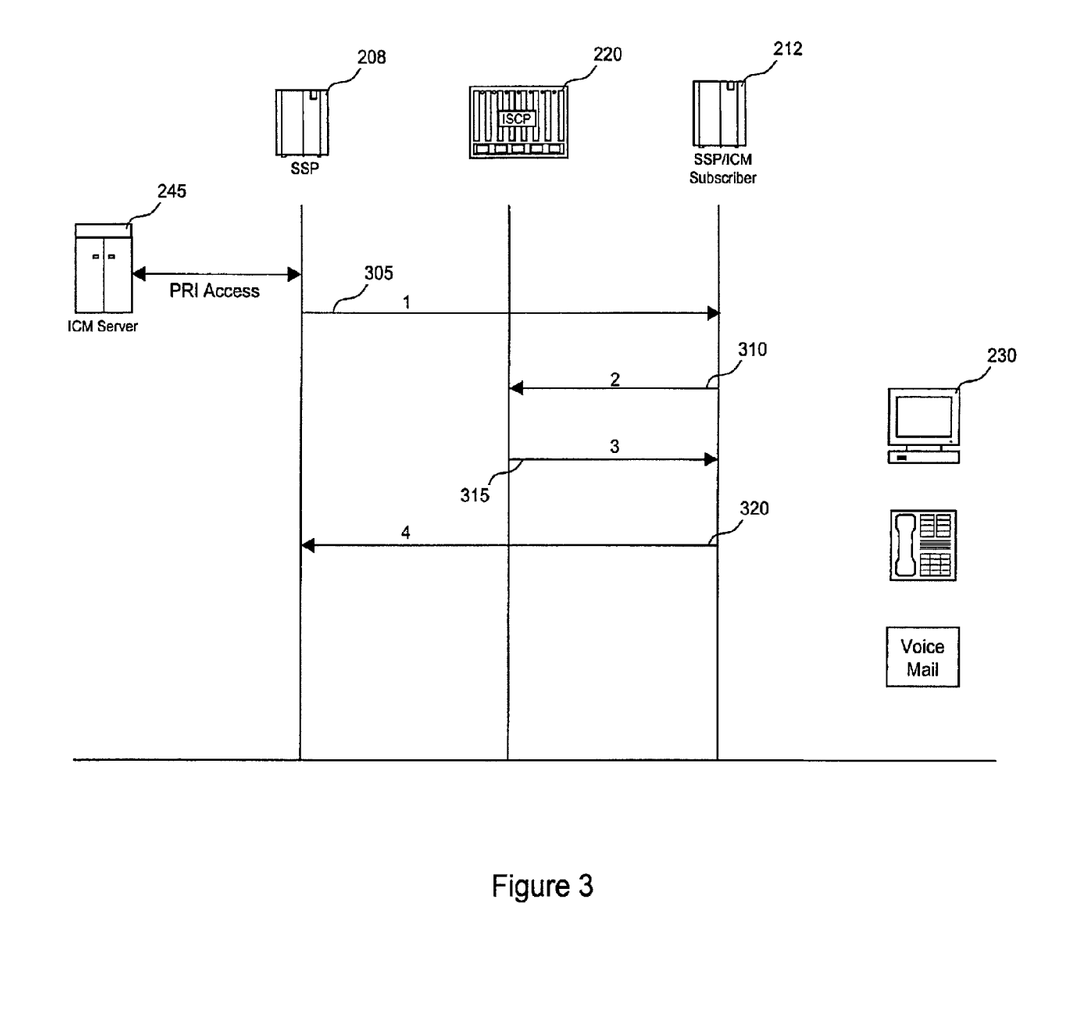
FIG. 3 is a call flow diagram for turning an internet call manager function on or off.

FIG. 3 depicts a call flow diagram for turning ICM processing on or off. Once an Internet connection is established with computer 230, the ICM server 245 originates a call-back to the subscriber's directory number as shown in flow 305. In a preferred embodiment, if the computer 230 has just established connection to the Internet, the ICM server 245 would originate a call with an invalid Calling Party Number (CPN) such as 999 999-0000. Alternately, if the computer 230 has just ended an Internet session, the ICM server 245 would originate a call with a CPN of 999 999-0001. Once the SSP 212 receives SS7 notification of the incoming call from the ICM server 245, a Termination Attempt Trigger (TAT) is launched within the SSP 212. This TAT includes the unique CPN received from ICM 245. At this time, based on the received CPN, the ISCP sets the service status and sends a disconnect request to the SSP 212. The ISDN B channel and the inter-office trunk connections are also disconnected.

Figure 4:
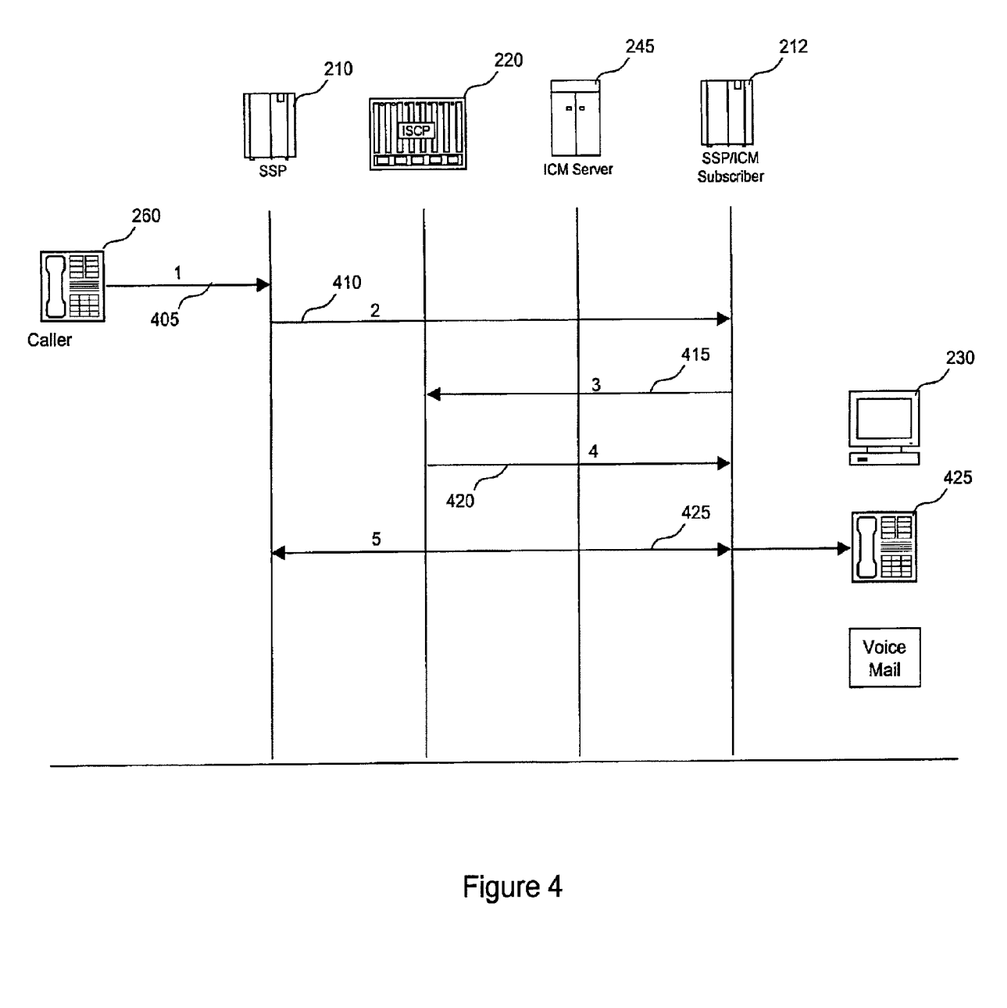
FIG. 4 is a call flow diagram for when the internet call manager function is off.

Referring to FIG. 4, when the ICM is off (i.e., there is not an Internet session in progress), and a caller 260 places a call to the ICM subscriber 230, the caller's telephone 260 initiates calling by conventional signaling provided to SSP 210 according to call flow step 405. The calling party's SSP 210 then negotiates and extends that call to the called party's SSP 212 as shown by 410. In this case, since the called party is a subscriber of ICM, a TAT trigger is on the ICM subscriber's line. The incoming call encounters the TAT trigger on the ICM subscriber's line causing SSP 212 to launch a query to ISCP 220 for further routing instructions. This query travels from the SSP 212 to the ISCP 220 at Step 415. ISCP 220 then accesses the subscriber's CPR and checks the service status flag. Since the subscriber is not connected to the Internet, the service status flag is off. The ISCP 220 then sends an authorize termination response to the subscriber's SSP 212 via line 420. Upon receipt of the authorize termination response from the ISCP 220, the incoming call from caller 260 is allowed to complete which then rings the subscriber's telephone 425. The subscriber answers their telephone 425 and normal conversation ensues per flow 425. Alternatively, if the subscriber is already involved in a telephone call other than to the Internet, the caller 260 will encounter a busy signal. Normal busy processing will then be handled by SSP 210. Thus, if the subscriber has call waiting service, the switch will send ringback signaling to the caller and will signal the called party that a second call is being attempted to that party. Similarly, if the subscriber has a Voice Mail System (VMS) service activated, the call will be forwarded to their VMS platform.

Figure 5:
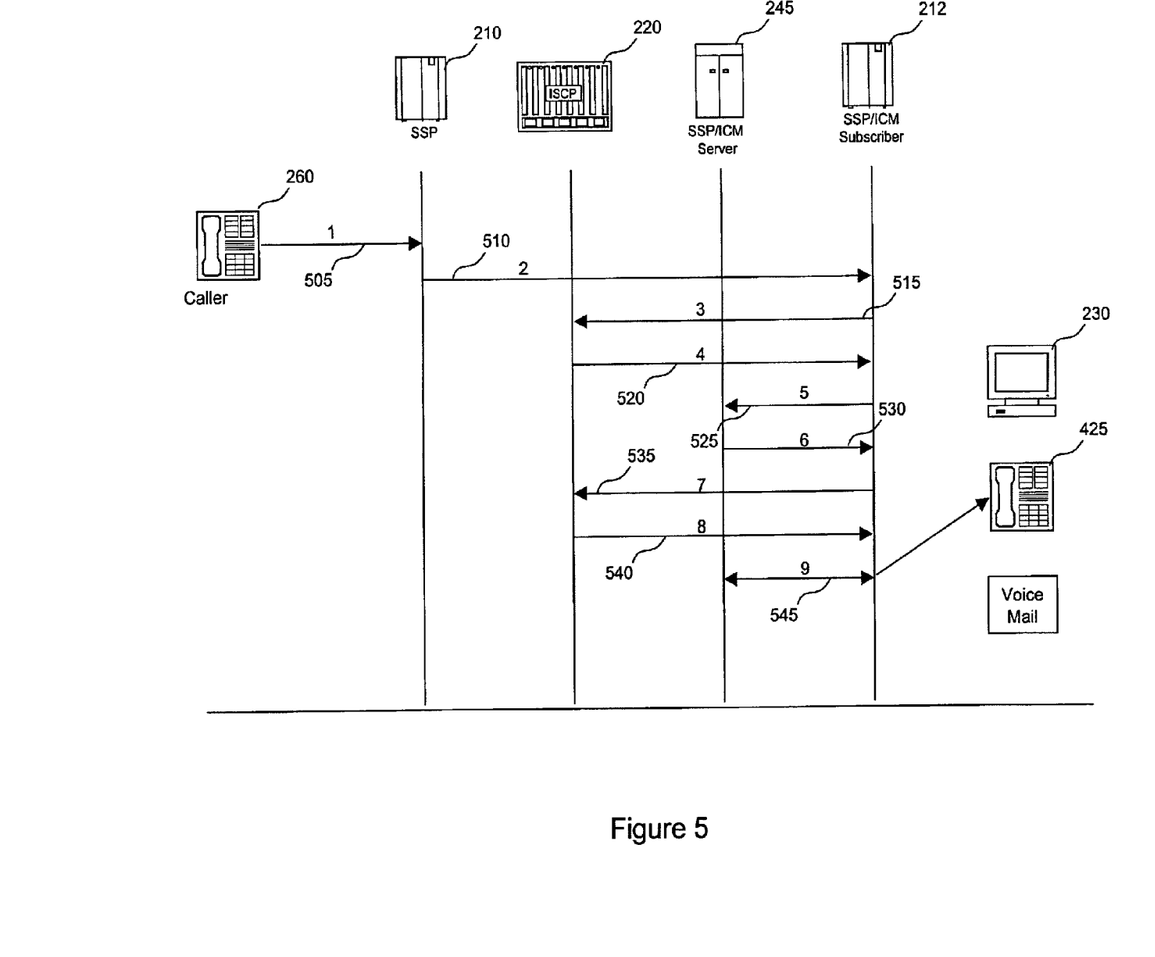
FIG. 5 is a call flow diagram for when the internet call manager is on and the called party wishes to answer the call.

FIG. 5 shows an alternative process according to the invention when a call is placed to an ICM subscriber 230 while ICM subscriber is connected to the Internet. In this case, caller 260 places a call 505 via SSP 210, which forwards the call at Step 510 to the called subscriber's SSP 212. At the called subscriber's SSP 212 the incoming call encounters the TAT (or similar trigger). The SSP 212 then launches a query for further instruction at 515 to the ISCP 220. The ISCP 220 finds a subscriber's CPR and checks the server status which is equal to "on" in this case since the subscriber is connected to the Internet. At this point, a forward call message 520 is sent to the SSP 212, which, at step 525, causes SSP 212 to forward the caller to the ICM server's PRI access. Upon arrival of the call at SSP/ICM Server 245, the latter coordinates with the Internet access provider to display a window on the subscriber's computer 230 screen informing the subscriber of the call and allowing the subscriber to choose one of several options for handling the call. In the preferred embodiment, the subscriber is given four choices, to answer the call (FIG. 5), to have a specific message played to the caller (FIG. 6), to forward the call (FIG. 7), or alternatively to ignore the call (FIG. 8). In FIG. 5, we assume that the subscriber had decided to answer the call so the ICM server 245 bridges and calls the subscriber at 530. Again the TAT trigger is encountered, but in this case the ICM server 245's CPN is equal to 999 999 0002. Receipt of the answer indicator will also turn ICM "off" at 535 and will allow the completion of the call from caller 260. The ISCP 220 sends an authorize termination response to the SSP 212. Finally, the subscriber answers the call at 545.

Figure 6:
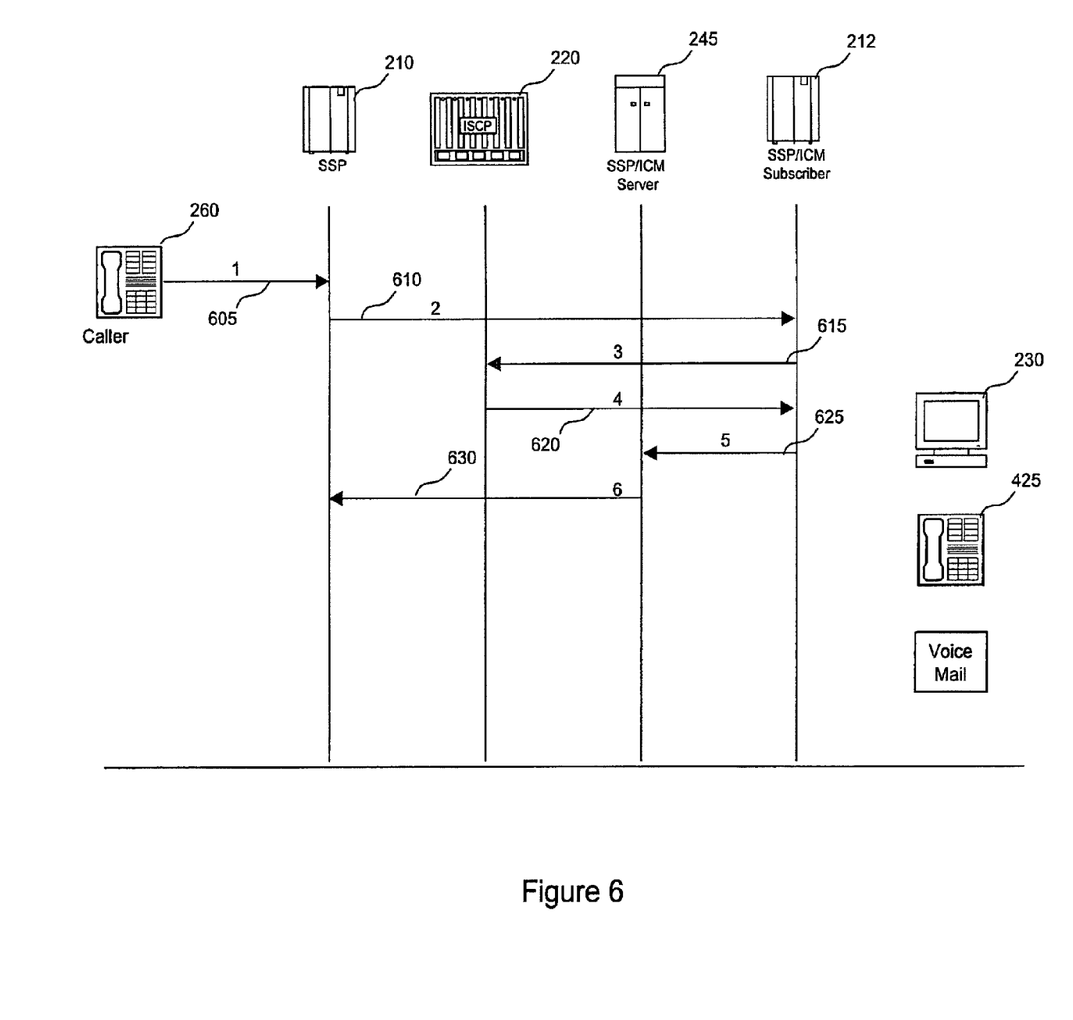
FIG. 6 is a call flow diagram for when the internet call manager is on and the called party connects the calling party to a prerecorded message.

FIG. 6's call processing flow diagram illustrates processing when the subscriber is currently accessing the Internet and the subscriber selects the "notify the caller" option. Caller 260 initiates a call at 605 to the subscriber's telephone number via SSP 210. At SSP 212 the TAT trigger is encountered on the called subscriber's line. The SSP 212 launches a query for further instruction at 615. The ISCP finds the subscriber's CPR and checks the service status which is "on" since the subscriber's computer 230 is known to be connected to the Internet. As previously described in connection with steps 515 through 530 of FIG. 5, at step 620 a forward call response is sent to the ICM subscriber's SSP 212. At step 625, SSP 212 forwards the caller to the PRI access for the SSP/ICM Server 245. Upon arrival of the call at SSP/ICM Server 245, the latter coordinates with the Internet access provider to display a window on the subscriber's computer 230 screen informing the subscriber of the call and allowing the subscriber to choose one of several options for handling the call. In this case, since the subscriber has selected the notify the caller option, the ICM server will play the requested announcement to the caller at 630.

Figure 7:
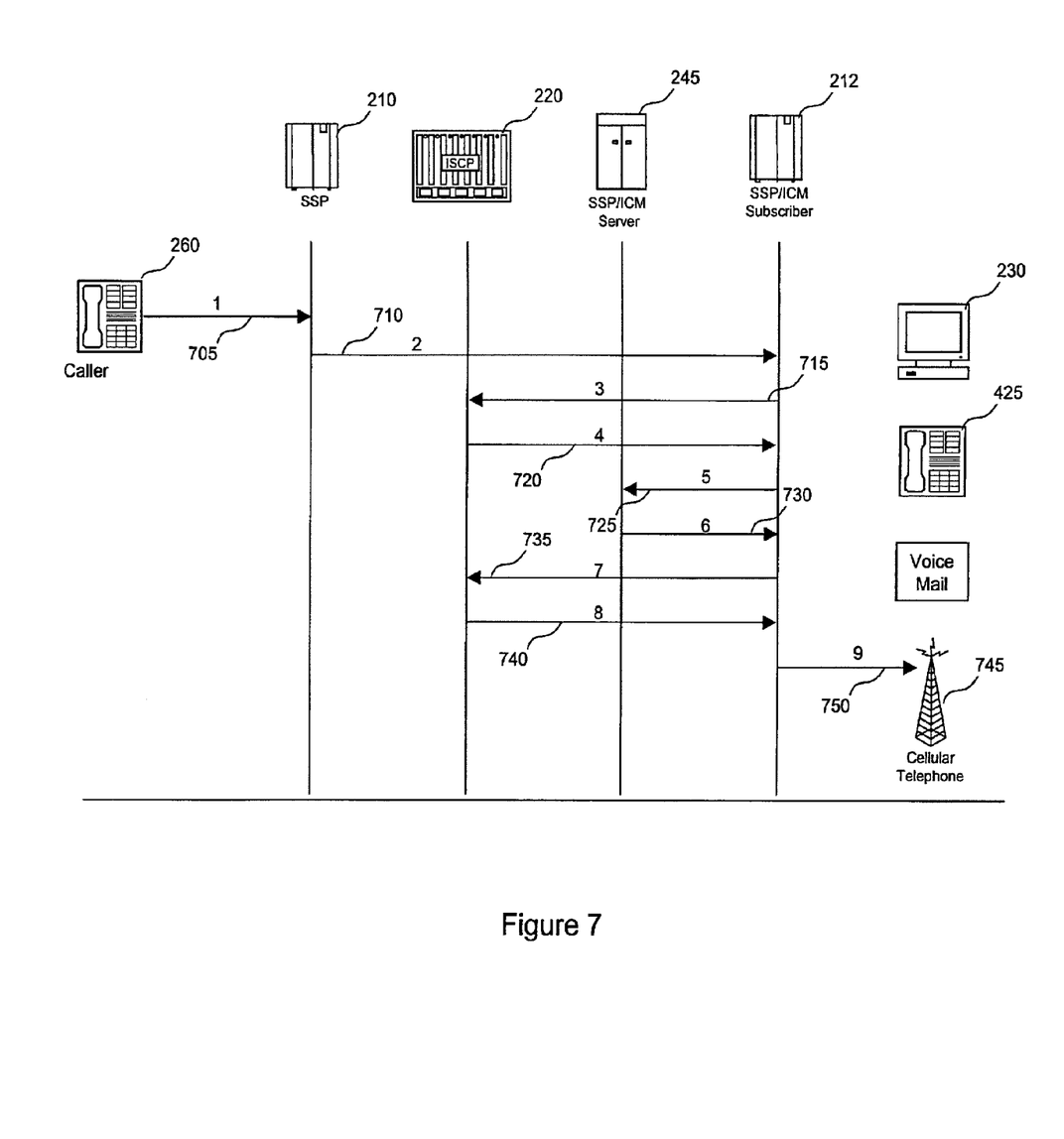
FIG. 7 is a call flow diagram for when the internet call manager is on and the called party forwards the call to another number.
Figure 8:
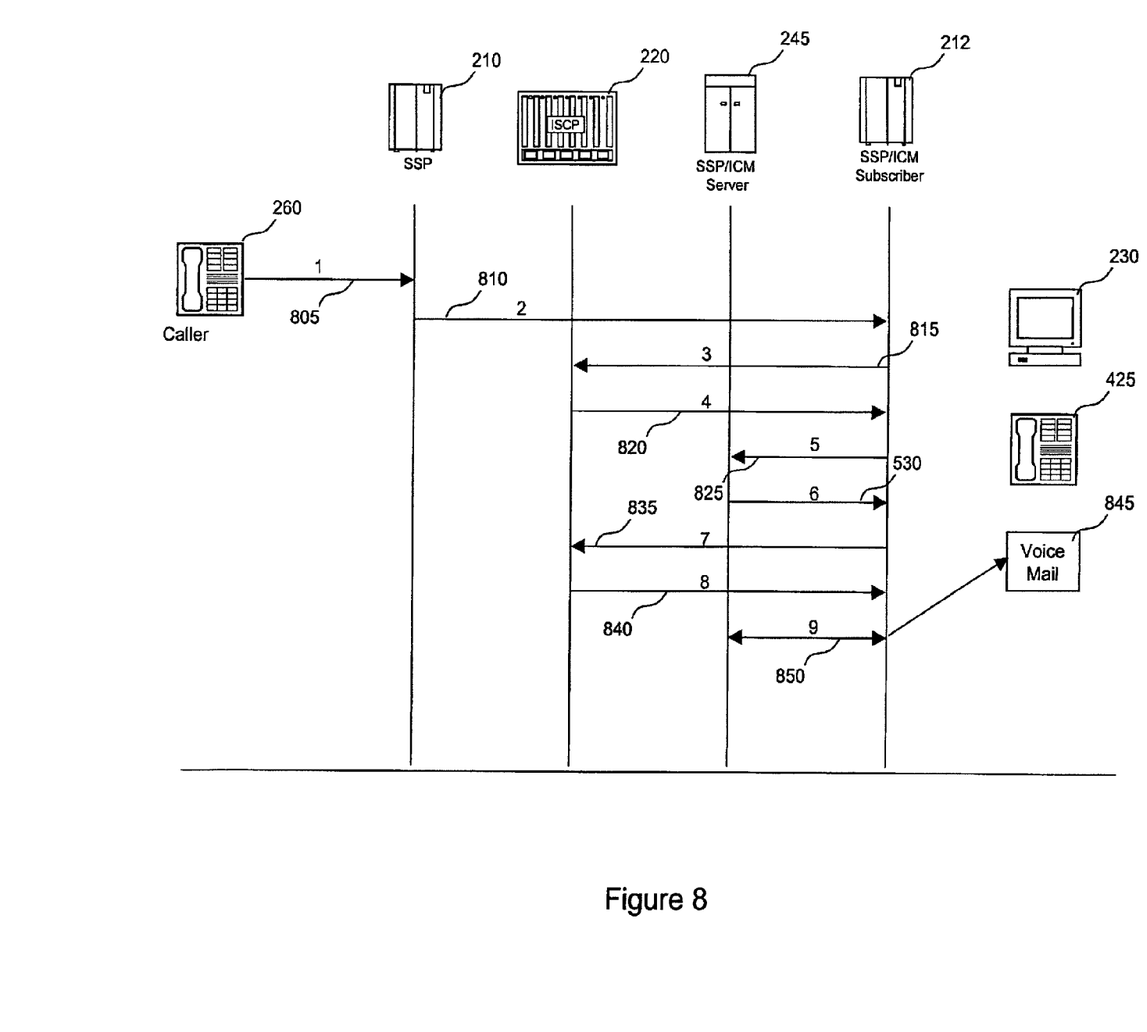
FIG. 8 is a call flow diagram for when the internet call manager is on and the called party decides to ignore the incoming call.

FIG. 7 depicts the control flow when the subscriber selects, via the computer 230's screen, the forward the call option. The flow in FIG. 7 is similar to the flows described in FIGS. 5 and 6 up to notification of the incoming call is forwarded to the ICM via the PRI link by the SSP 212 at 725 and the ICM server processes the call. When the subscriber, using their computer 230's screen, selects the "forward" option, the ICM server bridges and signals the SSP/ICM subscriber 212 to complete the call at 730. In this case, the incoming call encounters the TAT trigger and the CPN is set equal to the ten digit telephone number chosen by the subscriber for forwarding calls to. The ISCP 220 sends a forward call response to the SSP 212. The SSP 212 then forwards the call to the number which the subscriber had previously selected.

FIG. 8 shows the control flow when the subscriber, using the computer's 230 screen and appropriate input device, selects "ignore the call" option and subscribes to a network provided voice mail. The flow control up to the use of link of 825, when notification of the incoming call is forwarded to the ICM via PRI link and ICM server 245 processes the call, is similar to previous three figures. Since the ignore option was chosen by the subscriber, the ICM server bridges and notifies the subscriber's SSP 212 at 830. This call encounters the TAT trigger again, and the CPN is equal to 999 999 0003. If within the ISCP 220 the data template indicates a value life of ICM_VMAIL is equal to yes, then an authorize termination is sent from the ISCP 220 to the SSP 212. In this case, the caller 260 can leave a message on the subscriber's voice mail Step 845 at 850. If, however, the subscriber does not have network provided voice mail, the caller is held at the SSP/ICM Server 245 until timeout and the caller is disconnected.

Figure 9:
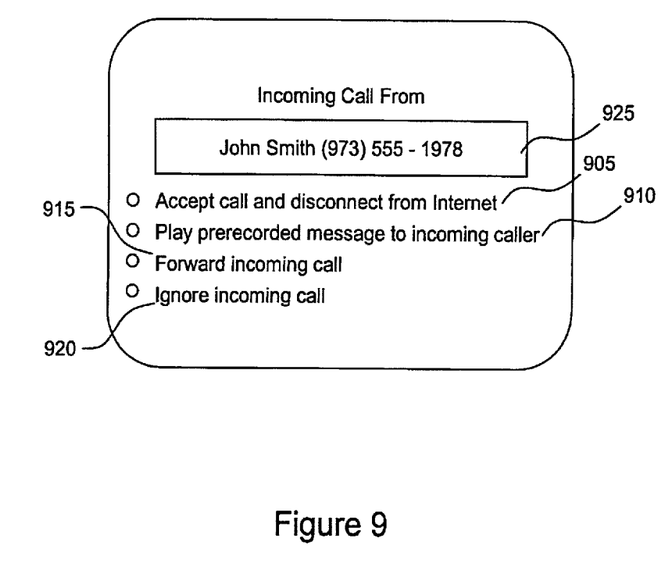
FIG. 9 is a sample pop-up window on the called party's server.

FIG. 9 shows one embodiment of the pop-up menu which is displayed on a user's computer screen when an incoming call is detected by the system. This pop-up menu allows the user to select between four options. The options include accept the call and disconnect from the Internet 905; play pre-recorded message to incoming caller 910; forward incoming call 915 and ignore incoming call 920. The forward incoming call 915 selection requires the user to have pre-defined a number to which the incoming call will be forwarded. Additionally, the pop-up menu shows the originating party and the originating party's telephone number. This information is acquired from the calling party's number in a look-up table.

A second embodiment of the present invention retains the incoming call at the called party's SSP. The called party's SSP will then send a message to the STP. The STP then coordinates with the ISCP and the LIDB to determine the calling party's information, whether the called party is connected to the Internet, and the final disposition of the incoming call. In this embodiment, the ICM application server (245 of FIG. 2) is replaced by a gateway. The gateway is now the interface between the Internet and the telephone network system. The gateway also acquires the called party's desired handling of the incoming call. In this embodiment, that gateway is an intelligent connection between the telephone network system and the Internet. This alternate embodiment also eliminates the requirement for telephone calls to be placed between the ISCP and the called party's SSP.

Additional enhancements to the current invention are available. One additional improvement is that the called party can send an e-mail message out to the calling party and respond to the incoming call. A second enhancement is the use of a local database to look up additional information pertaining to the incoming call or the party making the incoming call. For instance, if the called party has been researching a specific matter for the calling party, the pop-up menu on the called party's computer screen can display the calling party's number, the calling party's name and specific information from the local database pertaining to the calling party for instance, the status of the research project. A third enhancement is to provide for call completion of the incoming call using a voice-over-IP (VoIP) connection over the Internet.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. For example, although the application refers to use of an ISCP, generic SCP functionality is adequate to support the functionality of the invention. Further, other processing structures may be used, such as an Intelligent STP, etc., to support network functionality required to implement the invention in a switched network environment. It is therefore intended that the protection granted hereon be limited only by the definition contained in the appended claims and equivalents thereof.

What is claimed is:

1. A method of controlling a telecommunications network comprising:
    identifying a connection status of a subscriber line by:
        recognizing a busy condition of said subscriber line;
        initiating a first set-up call to said subscriber line in response to recognizing said busy condition, including transmitting a first call set-up message indicating a first special calling party number to said subscriber line, wherein the first set-up call is initiated automatically by a call manager in response to recognizing a busy condition;
        detecting a trigger when said first call reaches a switching point in the telecommunications network;
        in response to detecting said trigger, transmitting a first query message to a control point in the telecommunications network, said first query message including said special calling party number;
        receiving said first query message at said control point; and
        storing a status indicator of said condition in response to receiving said first special calling party number.

2. The method of claim 1 wherein recognizing a busy condition includes determining a service status associated with a subscriber telephone number and wherein initiating a first set-up call includes calling said subscriber telephone number.

3. The method of claim 1 wherein detecting a trigger is performed at a terminating switch serving a subscriber telephone line.

4. The method of claim 3 wherein initiating said first set-up call includes calling a telephone number of said subscriber telephone line.

5. The method of claim 1 wherein storing a status indicator of said busy condition in response to receiving said first special calling party number includes setting a flag as part of a call processing record of an associated subscriber.

6. The method of claim 1 further comprising transmitting a disconnect request.

7. The method of claim 1 wherein said first call set-up message comprises an ISDN User Part (ISUP) message.

8. The method of claim 1 wherein:
    transmitting a first query message includes transmitting a Transaction Capabilities Application Part (TCAP) message from said switching point to said control point;
    said control point comprises a Service Control Point (SCP); and
    said first special calling party number transmitted in a calling party identification portion of said TCAP message, said first special calling party number recognized as an invalid telephone number.

9. The method of claim 7 further comprising processing, in response to said status indicator, a subsequent second call initiated to the same telephone number as said first set-up call.

10. A telecommunications system comprising:
    a switched telephone network including a plurality of switching points interconnected by a plurality of communications links, and further including a number of subscriber lines associated with respective subscribers;

a database connected to said switched telephone network, said database storing call processing records associated with respective subscribers of said switched telephone network;

a server configured to identify a connection status of at least one of said subscriber lines by:

detecting a busy condition of a subscriber line associated with one of the respective subscribers and, in response to detecting said busy condition, initiating a set-up call to said subscriber line including a call set-up message indicating a special calling party number, wherein the call is automatically initiated at a call manager;

wherein said switching points are configured to receive said call set-up message and transmit a query message to said database in response to receiving said call set-up message, said query message including said special calling party number, and wherein said database is configured to receive said query message and to set a service status flag of a call processing record associated with said subscriber line in response to receiving said special calling party number.

11. The telecommunications system of claim 10 further comprising a server configured to detect a condition associated with said one subscriber and, in response, initiate said call to said one subscriber including said special calling party number, wherein said special calling party number being an invalid telephone number indicative of said condition.

12. The telecommunications system of claim 10 wherein said service status flag is also associated with said one subscriber.

13. The telecommunications system of claim 10 wherein said switching points are configured to selectively route an incoming call in response to a message from said database, said message reflecting a status of said service status flag.

14. The telecommunications system of claim 10 wherein said database comprises a Service Control Point (SCP), and said plurality of switching points comprise a plurality of Service Switching Points (SSPs).

15. A switched telephone network comprising:

a plurality of a Service Switching Points (SSPs) configurable to provision triggers associated with telephone lines of designated ones of subscribers served by respective ones of said SSPs;

a system configured to identify a connection status by detecting a busy condition associated with one of said telephone lines of one of the designated subscribers of the telephone network and, in response to said busy condition, initiating a set-up call to said telephone line using an ISDN User Part (ISUP) call set-up message including a special calling party number wherein said set-up call is initiated automatically at a call manager;

a service control point (SCP) connected to said plurality of SSPs and configured to store service status associated with each of said designated subscribers;

wherein said plurality of SSPs are further configured to receive said ISUP call set-up message including said special calling party number and, in response, transmit a TCAP query message including said special calling party number to said SCP, and wherein said SCP is configured to receive said query message, modify a service status indicator associated with the one of the designated subscribers based on said special calling party number, and supply call handling instructions based on the service status indicator associated with the one of the designated subscribers for subsequent calls to said telephone line.

16. The telecommunications system of claim 15 wherein said special party numbers are different invalid calling party numbers associated with respective conditions to be reflected by said service status indicators.

17. A system comprising:

a called service switching point configured to receive an incoming call from a calling party;

an application server in communication with said called service switching point and configured to identify a status of a subscriber line by:

detecting a busy condition on said subscriber line, said busy condition indicating that said subscriber line cannot receive said incoming call;

initiating a first set-up call to said subscriber line in response to recognizing said busy condition, including transmitting a first call set-up message indicating a first special calling party number to said subscriber line, wherein the first set-up call is initiated automatically by a call manager; and wherein said application server is further configured to prompt a user with at least one option for handling said incoming call in response to said busy condition.

18. A system as set forth in claim 17, further comprising a service control point in communication with said application server, and wherein said application server is configured to communicate the presence of said busy condition to said service control point.

19. A system as set forth in claim 18, wherein said called service switching point is configured to query said service control point to determine whether said busy condition is present.

20. A system as set forth in claim 19, wherein said called service switching point is configured to query said service control point to determine whether said busy condition is present in response to a trigger implemented by said called service switching point, said trigger instructing said called service switching point to query said service control point upon receipt of said incoming call.

21. A system as set forth in claim 17, wherein said at least one option for handling said incoming call includes at least one of answering said call, playing a message to the caller, forwarding said call to a predetermined forwarding number, and ignoring said call.

* * * * *